United States Patent
Sano (10) Patent No.: US 10,142,613 B2
(45) Date of Patent: Nov. 27, 2018

(54) IMAGE PROCESSING APPARATUS, IMAGE PROCESSING SYSTEM, AND IMAGE PROCESSING METHOD

(71) Applicant: Kabushiki Kaisha Toshiba, Minato-ku, Tokyo (JP)

(72) Inventor: Toru Sano, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 198 days.

(21) Appl. No.: 15/056,164

(22) Filed: Feb. 29, 2016

(65) Prior Publication Data

US 2017/0069072 A1 Mar. 9, 2017

Related U.S. Application Data

(60) Provisional application No. 62/214,133, filed on Sep. 3, 2015.

(51) Int. Cl.
| | |
|---|---|
| *H04N 13/02* | (2006.01) |
| *H04N 13/246* | (2018.01) |
| *G06K 9/62* | (2006.01) |
| *G06T 7/593* | (2017.01) |
| *H04N 13/00* | (2018.01) |

(52) U.S. Cl.
CPC ......... *H04N 13/246* (2018.05); *G06K 9/6215* (2013.01); *G06T 7/593* (2017.01); *H04N 2013/0081* (2013.01)

(58) Field of Classification Search
CPC ........ G06K 9/6215; G06T 2207/20228; G06T 7/002; G06T 7/0022; G06T 7/0246; H04N 13/0246

(Continued)

(56) References Cited

U.S. PATENT DOCUMENTS

| | | | |
|---|---|---|---|
| 6,092,130 A * | 7/2000 | Horiike | H04N 7/52 341/67 |
| 6,259,732 B1 * | 7/2001 | Lee | H04N 19/563 375/240 |

(Continued)

FOREIGN PATENT DOCUMENTS

| | | |
|---|---|---|
| JP | 2008-026088 A | 2/2008 |
| JP | 2012-133408 A | 7/2012 |

OTHER PUBLICATIONS

Kang et al, Horizontal parallax distortion correction method in toed-in camera with wide-angle lens (Year: 2009).*

*Primary Examiner* — Shan E Elahi
(74) *Attorney, Agent, or Firm* — White & Case LLP (57) ABSTRACT

An image processing apparatus includes: a first cost calculating section configured to calculate similarity degrees between a first pixel in a first image and plural second pixels located in a horizontal-direction first range in a second image, and extract a second pixel with a highest similarity degree; a second cost calculating section configured to calculate a similarity degree between plural third pixels in a vertical-direction second range including the extracted second pixel and the first pixel and extract a third pixel with a highest similarity degree; an amount-of-difference buffer recording difference between a vertical-position of the extracted third pixel and the first pixel as an amount of difference; and a second position setting section configured to determine positions of the second pixels for which a similarity degree to the first pixel for which a disparity is calculated next is calculated.

17 Claims, 7 Drawing Sheets

(58) Field of Classification Search
USPC .......................................................... 348/47
See application file for complete search history.

(56) References Cited

U.S. PATENT DOCUMENTS

| | | | | |
|---|---|---|---|---|
| 6,636,644 | B1 * | 10/2003 | Itokawa | G06T 9/20 |
| | | | | 375/240.08 |
| 6,952,501 | B2 * | 10/2005 | Nakayama | H04N 19/563 |
| | | | | 375/240.08 |
| 7,092,015 | B1 | 8/2006 | Sogawa | |
| 7,444,013 | B2 | 10/2008 | Chen | |
| 8,326,020 | B2 | 12/2012 | Lee et al. | |
| 8,818,133 | B2 | 8/2014 | Richards | |
| 9,053,550 | B2 | 6/2015 | Li et al. | |
| 2011/0075025 | A1 * | 3/2011 | Cho | G06T 3/4053 |
| | | | | 348/441 |
| 2011/0096832 | A1 * | 4/2011 | Zhang | G06T 7/579 |
| | | | | 375/240.08 |
| 2011/0295839 | A1 * | 12/2011 | Collins | G06F 17/30463 |
| | | | | 707/716 |
| 2012/0027092 | A1 * | 2/2012 | Matsui | H04N 19/105 |
| | | | | 375/240.16 |
| 2013/0002814 | A1 | 1/2013 | Park et al. | |
| 2014/0036033 | A1 * | 2/2014 | Takahashi | H04N 19/00769 |
| | | | | 348/43 |
| 2015/0172650 | A1 * | 6/2015 | Koo | H04N 19/176 |
| | | | | 375/240.03 |
| 2015/0348266 | A1 | 12/2015 | Li et al. | |
| 2016/0316221 | A1 * | 10/2016 | Ikai | H04N 19/597 |

\* cited by examiner

IMAGE PROCESSING APPARATUS, IMAGE PROCESSING SYSTEM, AND IMAGE PROCESSING METHOD

CROSS-REFERENCE TO RELATED APPLICATIONS

This application claims the benefit of Provisional Application No. 62/214,133, filed on Sep. 3, 2015, the entire contents of which are incorporated herein by reference.

FIELD

Embodiments described herein relate generally to an image processing apparatus, an image processing system and an image processing method.

BACKGROUND

When a same subject is captured by two cameras arranged horizontally, a difference occurs in a horizontal direction between positions of the subject in captured two images because of a difference between positions of the cameras. The difference between the positions of the subject in both images is called "disparity". A distance from the cameras to the subject is proportional to an inverse of the disparity. That is, the disparity decreases as a subject is farther and increases as the subject is nearer.

In stereo matching, a small area (block) is cut out from each of images captured by two cameras, and the disparity is determined by searching for a position where a degree of similarity between both small areas is highest, between the images. More specifically, when an image captured by one camera (for example, a left image captured by a camera arranged on a left side) is caused to be a reference, a range within which a similarity degree is searched in an image captured by the other camera (for example, a right image captured by a camera arranged on a right side) is from same coordinates as coordinates of a base block in the left image to coordinates away from the coordinates in a horizontal direction by a maximum disparity (for example, 128 pixels).

Actually, however, it is difficult to arrange two cameras completely horizontally, and a difference in a vertical direction or a rotation direction occurs. When such a difference occurs, matching may not be obtained, or a block different from the base block may match wrongly even if a block located on a line with a vertical-direction coordinate equal to a vertical-direction coordinate of the base block is searched for by changing a horizontal-direction position.

If such a difference is a static difference between cameras due to setting conditions or individual differences of lenses, it is possible to rectify the difference by an inspection performed at a manufacturing stage or at time of shipment. However, as for a dynamic difference between cameras due to vibration or the like by moving objects such as automobiles, the difference cannot be rectified by the inspection performed at time of shipment or the like.

Therefore, a method is conceivable in which a similarity degree search range is spread also in the vertical direction on an assumption that there is a vertical-direction difference to some extent. However, there are problems that the number of functional units required for similarity degree calculation increases and that a processing time period is lengthened.

DETAILED DESCRIPTION

An image processing apparatus of an embodiment includes: a first cost calculating section configured to calculate a degree of similarity between a first pixel in a first image and each of a plurality of second pixels located in a horizontal-direction first range in a second image, extract a second pixel with a highest similarity degree, and calculate a disparity from the first pixel. Further, the image processing apparatus of the embodiment includes: a second cost calculating section configured to calculate, only for the extracted second pixel, a degree of similarity between a plurality of third pixels existing in a vertical-direction second range that includes the extracted second pixel and the first pixel, in the second image, and extract a third pixel with a highest similarity degree; an amount-of-difference buffer configured to record a difference between a vertical-direction position of the extracted third pixel and the first pixel as an amount of difference of the extracted third pixel; and a search position setting section configured to determine positions of the second pixels for which a degree of similarity to the first pixel for which a disparity is calculated next is calculated, according to data of the amount-of-difference buffer.

First Embodiment

Figure 1:
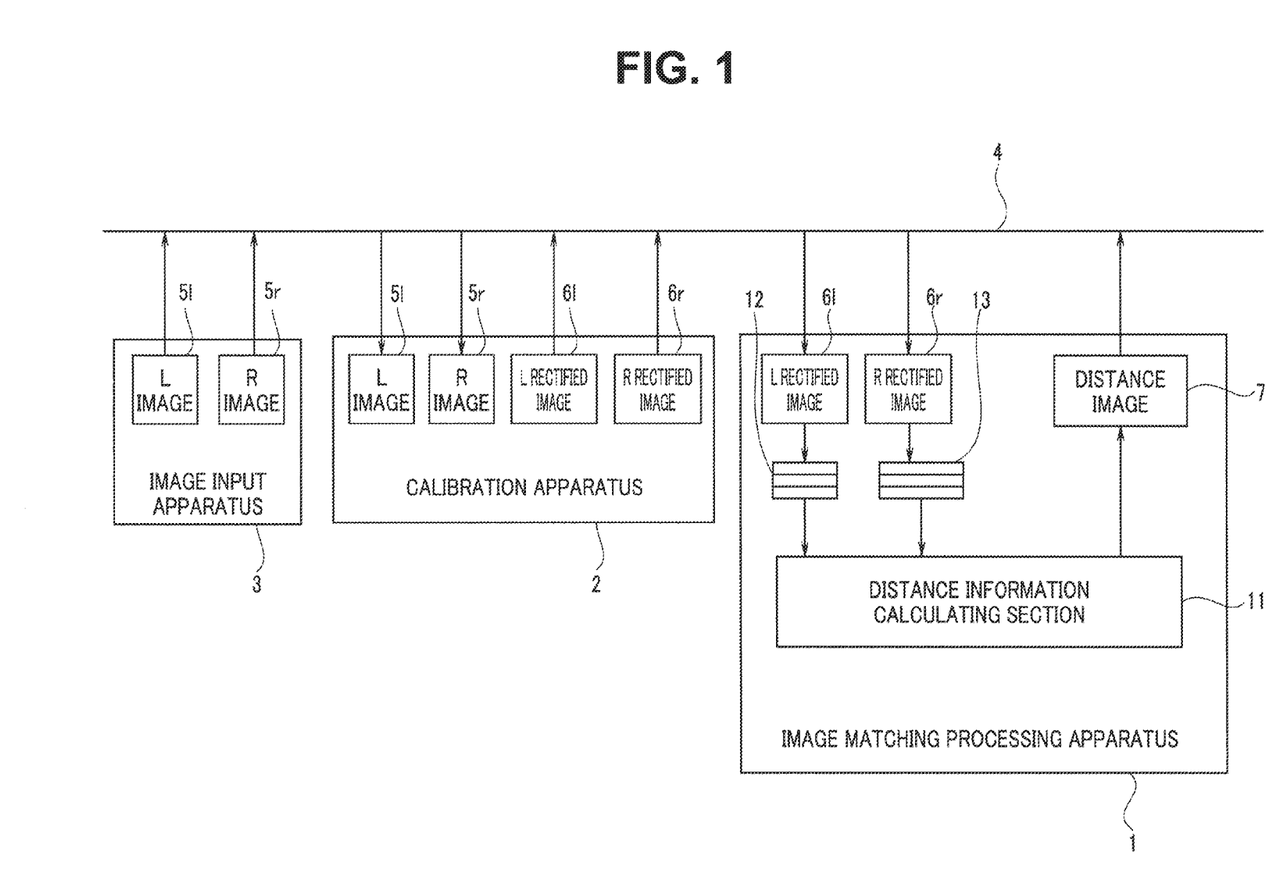
FIG. 1 is a diagram showing an example of a configuration of an image processing system according to a present embodiment.

FIG. 1 is a diagram showing an example of a configuration of an image processing system according to a present embodiment. The image processing system is configured with an image matching processing apparatus (hereinafter referred to as an image processing apparatus) 1, a calibration apparatus 2, an image input apparatus 3, and a bus 4 connecting them. FIG. 1 illustrates an image processing system configured to perform a stereo matching process using right and left disparity images by two cameras.

A plurality of images captured by cameras not shown are inputted to the image input apparatus 3. For example, the plurality of images are an L image 5*l* captured by a camera located on a left side and an R image 5*r* captured by a camera located on a right side. The L image 5*l* and the R image 5*r* are inputted to the calibration apparatus 2 via the bus 4.

The calibration apparatus 2 rectifies a static difference between the cameras due to setting conditions and individual differences of lenses and the like. More specifically, an image obtained by capturing an image of a particular graphic pattern with a known size, such as a grid pattern, is used to set internal parameters and external parameters beforehand. Then, the calibration apparatus 2 rectifies, for each of the L image 5*l* and the R image 5*r*, a static difference using the internal parameters and the external parameters and generates an L rectified image 6*l* and an R rectified image 6*r*. Note that the internal parameters indicate internal characteristics of the cameras, such as a focal distance, an image principal point and lens distortion. Further, the external parameters are parameters of rotation/parallel movement of the cameras in a three-dimensional space. In a stereo image, the external parameters indicate a degree of rotation/parallel movement of one image when the other image is regarded as a base image. The L rectified image 6*l* and the R rectified image 6*r* are inputted to the image processing apparatus 1 via the bus 4.

The image processing apparatus 1 rectifies a dynamic difference between the cameras due to vibration and the like. Further, the image processing apparatus 1 performs stereo matching using the L rectified image 6*l* and the R rectified image 6*r* to generate a distance image (an image indicating a distance from the cameras to a subject) 7. The image processing apparatus 1 has a distance information calculating section 11, an L image line buffer (hereinafter referred to as an L line buffer) 12 and an R image line buffer (hereinafter referred to an R line buffer) 13.

The L line buffer 12 is a buffer configured to store pixel data corresponding to a plurality of lines including a line of a central pixel in a pixel block for which disparity calculation is to be performed, in the L rectified image 6*l*. The R line buffer 13 is a buffer configured to store pixel data corresponding to the plurality of lines including the line of the central pixel in the pixel block for which disparity calculation is to be performed, in the R rectified image 6*r*.

Note that description will be made below on a case where similarity degree search is performed on an assumption that the L rectified image 6*l* is a base image (a first image) and the R rectified image 6*r* is a referenced image (a second image).

Further, it is common to perform disparity calculation by referring to a pixel block constituted by a plurality of pixels. Description will be made below by showing a central pixel of the pixel block as a target pixel. Therefore, the disparity calculation is performed with use of a plurality of pieces of pixel data included in the pixel block, the center of which is the target pixel.

Figure 2:
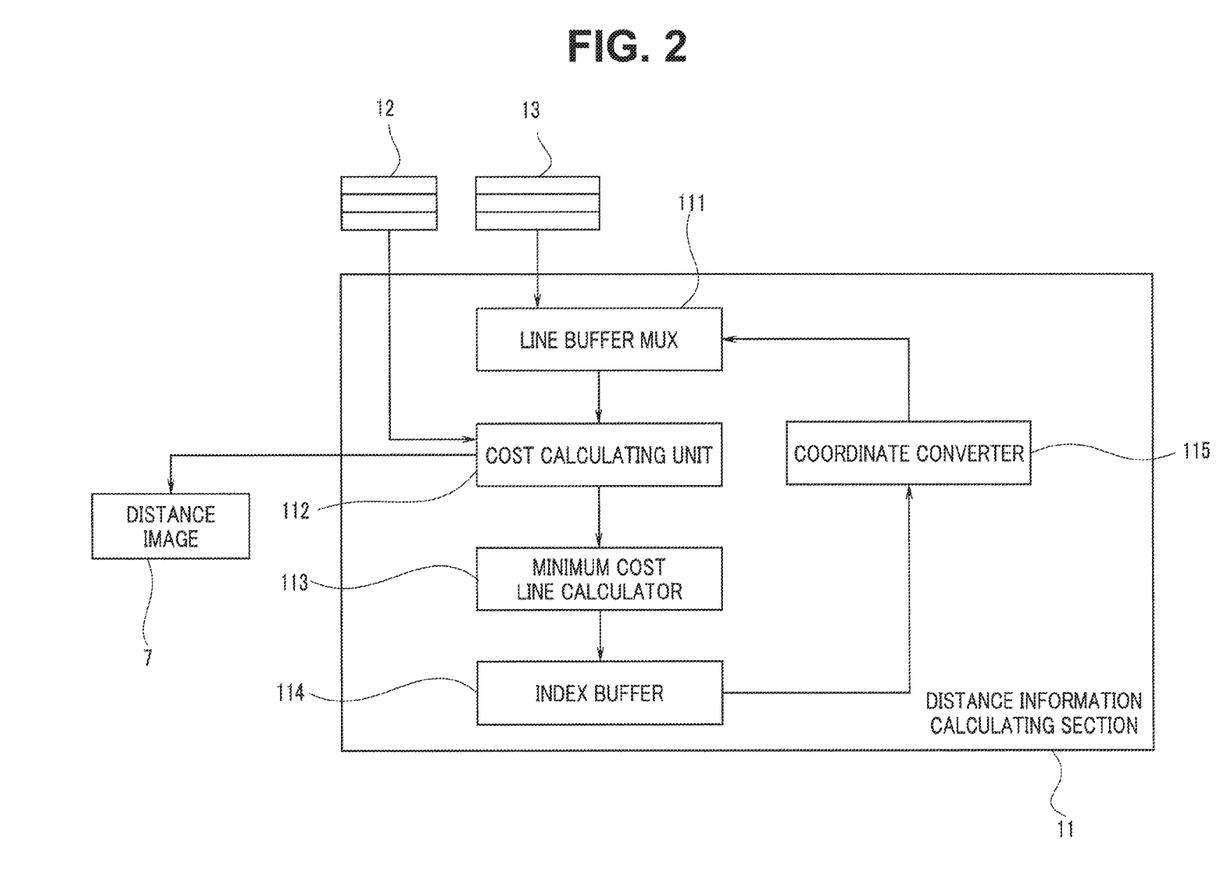
FIG. 2 is a diagram showing an example of a detailed configuration of a distance information calculating section 11.

The distance information calculating section 11 searches for a pixel with a highest degree of similarity for each of pixels of a base image, in a referenced image, calculates a disparity and outputs the disparity as a disparity image. Here, the disparity refers to a horizontal-direction difference. FIG. 2 is a diagram showing an example of a detailed configuration of the distance information calculating section 11. The distance information calculating section 11 has a line buffer multiplexer (hereinafter referred to as a line buffer MUX) 111, a cost calculating unit 112, a minimum cost line calculator 113, an index buffer 114 and a coordinate converter 115.

The index buffer 114 as an amount-of-difference buffer is a memory configured to record a result of vertical-direction similarity degree search. The index buffer 114 is configured to store data identifying a vertical position (an amount of vertical-direction difference) as an index. The line index buffer 114 is used to identify which vertical-direction line to extract pixels from as pixels for which similarity degree is to be calculated, for each of horizontal-direction positions included in a similarity degree search area for a target pixel (a first pixel) for which disparity calculation is to be performed next, in an R line buffer 13 in which the referenced image is stored. The line index buffer 114 has a size of log 2 (a maximum amount of vertical-direction difference)×(a maximum horizontal-direction disparity). For example, when an amount of vertical-direction difference (hereinafter simply referred to as an amount of difference) is within a range from an immediately upper one line to an immediately lower one line relative to a line of a target pixel, a width of difference is three lines. Therefore, a data volume required to identify a line to be extracted for similarity degree calculation is two bits. When the maximum disparity is 128 pixels, 2-bit data for identifying a vertical position is recorded as an index for each of 128 elements (from disparities 0 to 127 pixels), for horizontal positions of a target pixel. Each time vertical-direction similarity degree search is performed by the minimum cost line calculator 113, data (a search result) recorded in the index buffer 114 is updated.

The coordinate converter 115 as a search position setting section associates the respective elements of the index buffer 114 with search pixels (second pixels) for a next target pixel. Then, the coordinate converter 115 identifies positions of the search pixels in the referenced image using recorded indexes and inputs the positions to the line buffer MUX 111.

For the next target pixel, the line buffer MUX 111 as a search pixel data extracting section acquires pixel data for similarity degree search from the R line buffer 13 based on position information about the search pixels.

The cost calculating unit 112 as a horizontal-direction cost calculating section (a first cost calculating section) calculates a degree of similarity between the pixel data inputted from the line buffer MUX 111 and pixel data of a target pixel acquired from the L line buffer 12 in which the base image is stored, and extracts a position of a pixel with a highest similarity degree. Note that an existing quantified cost function, such as a SAD function, is used to calculate the similarity degree. A horizontal-direction difference between the position of the pixel with the highest similarity degree and a position of the target pixel is determined, and the difference is caused to be a disparity at position of the target pixel. The position of the pixel with the highest similarity degree is inputted to the minimum cost line calculator 113.

The minimum cost line calculator 113 as a vertical-direction cost calculating section (a second cost calculating section) calculates similarity degree for pixels located between lines away from each other by the maximum amount of difference in the vertical direction, with the position of the pixel with the highest similarity degree as a center (third pixels). A coordinate indicating a horizontal-direction pixel position and a coordinate indicating a vertical-direction pixel position are assumed to be an X and a Y, respectively. The similarity degree search is performed for three pixels of (X,Y−1), (X,Y) and (X,Y+1), for example, in a case where the maximum amount of vertical-direction difference is one line, and the position of the pixel with the highest similarity degree is (X,Y). Note that an existing quantified cost function, such as the SAD function, is used to calculate the similarity degree, similarly to the cost calculating unit 112.

Then, a vertical-direction difference between a search pixel with a highest similarity degree and the target pixel is determined and inputted to the index buffer 114 as an amount of difference at the target pixel. For example, if a disparity is two pixels, a maximum amount of vertical-direction difference is one line, and the pixel with the highest similarity degree is (50,25), for a target pixel (52,25), similarity degree search is performed for (50,24), (50,25) and (50,26). As a result, if the similarity degree of the pixel (50,24) is calculated as the highest, the amount of difference is −1. For an element which stores such data that the disparity from the target pixel is two pixels, among a plurality of elements constituting the index buffer 114, the data of the element is updated to −1.

Figure 3:
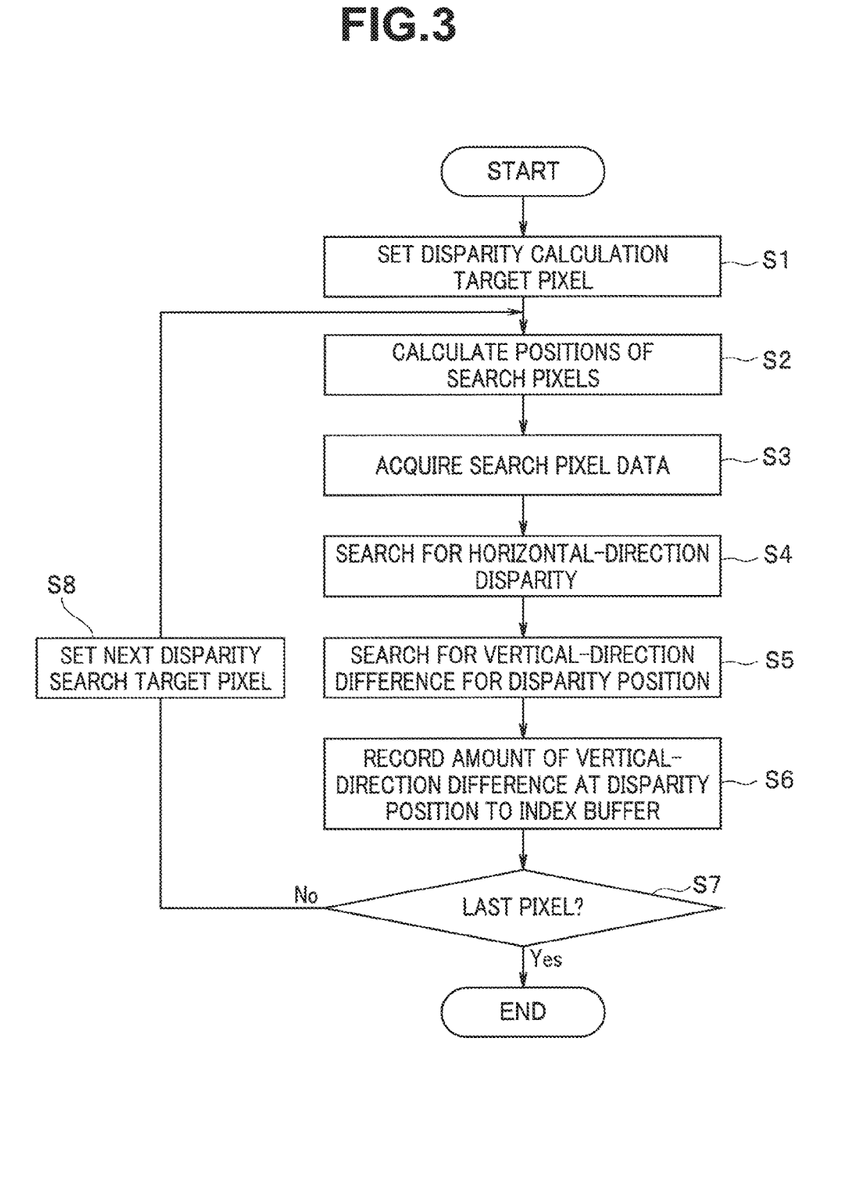
FIG. 3 is a flowchart illustrating an example of a procedure for a disparity calculation method in the image processing apparatus 1.

Next, a flow of a disparity calculation method in the image processing apparatus 1 will be described. FIG. 3 is a flowchart illustrating an example of the disparity calculation method in the image processing apparatus 1.

First, a target pixel is set in the base image (S1). It is necessary to calculate a disparity for all pixels of the base image in order to create the distance image 7. Here, description will be made on a case where, in a case of performing raster scanning in a direction from upper left to lower right of the base image, target pixels are sequentially set to calculate the disparity of each pixel.

Next, the coordinate converter 115 calculates positions of search pixels used for calculating a disparity for the target pixel (S2). The coordinate converter 115 determines position information about the search pixels, from the indexes of the respective elements stored in the index buffer 114 and the position of the target pixel.

Figure 4:
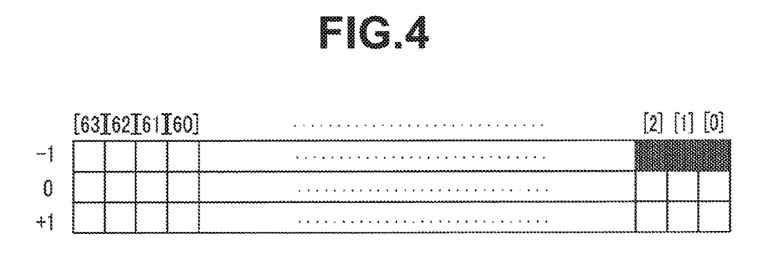
FIG. 4 is a diagram for illustrating difference information stored in an index buffer 114.

FIG. 4 is a diagram for illustrating difference information stored in the index buffer 114. The index buffer 114 has elements corresponding to the maximum disparity. For example, if the maximum disparity is 64 pixels, the index buffer 114 has 64 elements. An amount of difference at each element is recorded as an index in order beginning with an element with a maximum disparity and ending with an element with a minimum disparity. That is, an amount of difference at (base pixel position−63 pixel position), an amount of difference at (base pixel position−62 pixel position), . . . , an amount of difference at (base pixel position−1 pixel position), and an amount of difference at the base pixel position are recorded in an element [63], an element [62], . . . , an element [1] and an element [0], respectively, as indexes. Here, the base pixel position is a target pixel position for which disparity search is performed last.

Note that, in FIG. 4, a line indicating the amount of difference is indicated by being shaded, for each element, so that the amount of difference can be easily grasped visually. Note that all the elements are empty (in a state that indexes are not recorded) in an initial state.

The number of search pixels is the maximum disparity+1. For example, if the maximum disparity is 64 pixels, and the target pixel is (101,25), a horizontal-direction search area in the referenced image is X=37 to 101, and the number of search pixels included in the range is 64+1=65. The coordinate converter 115 determines vertical-direction positions of the search pixels using indexes of the respective elements stored in the line index buffer 114, in ascending order of disparity from the target pixel.

As for such a search pixel that a disparity from the target pixel is 0, it is not possible to refer to an amount of difference because there is no corresponding element in the index buffer 114. Therefore, pixels included in all lines within a range of the maximum amount of difference are caused to be search pixels. That is, if the maximum amount of difference is three lines, then three pixels, a pixel at a same position as the target pixel and pixel located above and below the target pixel by one line in the vertical direction, are caused to be search pixels.

As for such a search pixel that a disparity from the target pixel is one or more pixels, a vertical-direction position is determined by referring to an index stored in the index buffer 114. For example, as for a search pixel with a disparity of one pixel, an index recorded in the element [0] is referred to, and, as for a search pixel with a disparity of two pixels, an index recorded in the element [1] is referred to. That is, as for a search pixel with a disparity of n pixels, an index recorded in an element [n−1] is referred to. If an index is not recorded in a corresponding element, then a pixel at a same position as the target pixel is caused to be a search pixel on an assumption that the amount of difference is 0.

Figure 5:
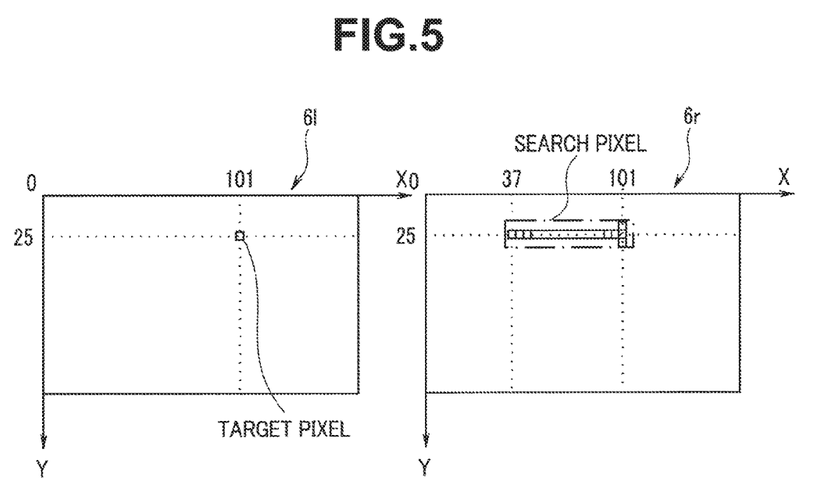
FIG. 5 is a diagram illustrating an example of search pixel positions calculated by a coordinate converter 115.

FIG. 5 is a diagram illustrating an example of search pixel positions calculated by the coordinate converter 115. For example, if the maximum disparity is 64 pixels, a target pixel in the L rectified image 6*l* is (101,25), and all the elements of the index buffer 114 are empty (in the initial state), then the number of search pixels in the R rectified image 6*r* is 67 pixels, and positions of the pixels are (X,Y)=(101,24), (101,25), (101,26), (100,25), (99,25), . . . , (39,25), (38,25) and (37,25).

Next, the line buffer MUX 111 acquires pixel data to be used for calculating a disparity for the target pixel from the R line buffer 13 based on the position information about the search pixels calculated at S2 and inputs the pixel data to the cost calculating unit 112 (S3).

Next, the cost calculating unit 112 acquires target pixel data from the L line buffer 12 and calculates a degree of similarity between the target pixel and each of the plurality of pieces of search pixel data acquired at S3. Then, a search pixel with a highest similarity degree is extracted. Furthermore, a difference between horizontal-direction positions of the extracted pixel and the target pixel is determined, and the difference is caused to be a disparity at the target pixel (S4). The position of the search pixel with the highest similarity degree is inputted to the minimum cost line calculator 113.

Figure 6:
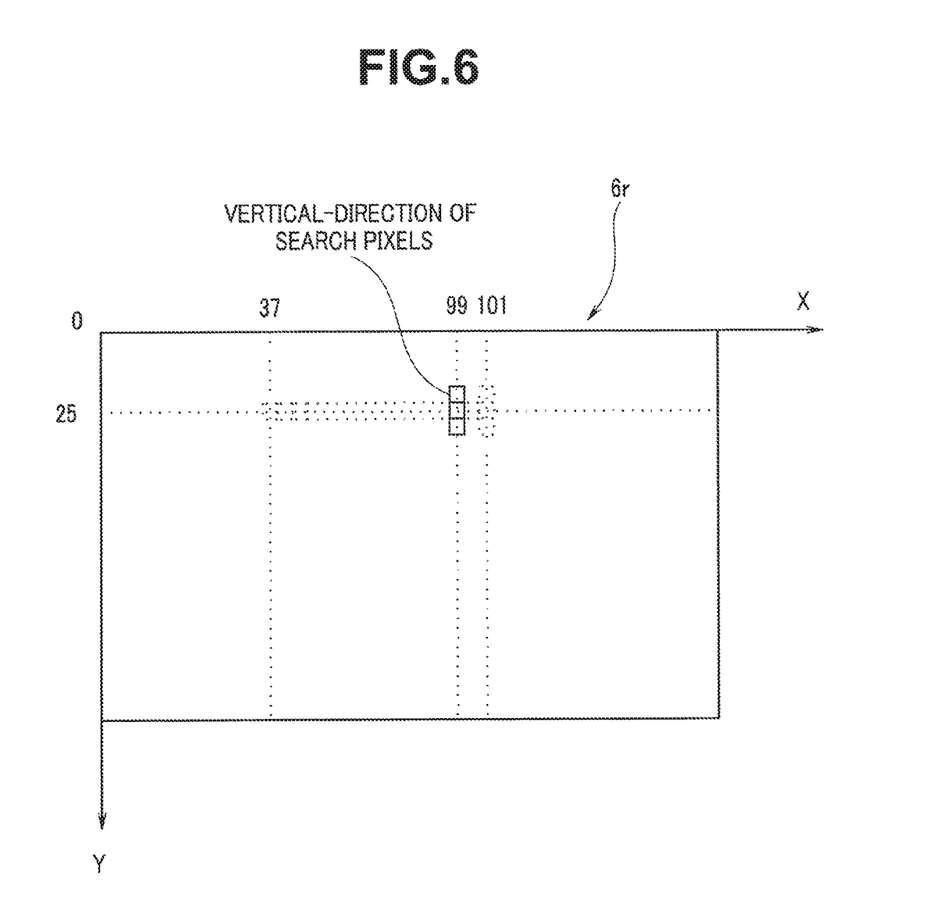
FIG. 6 is a diagram illustrating an example of search pixel positions in the minimum cost line calculator 113.

For pixels included in the range corresponding to the maximum amount of vertical-direction difference, with the position (disparity) of the search pixel with the highest degree of similarity to the target pixel as a center, the minimum cost line calculator 113 calculates a degree of similarity to the target pixel (S5). FIG. 6 is a diagram illustrating an example of search pixel positions in the minimum cost line calculator 113. When the search pixel with the highest similarity degree is (99,25), and the maximum amount of difference is three lines, the degree of similarity to the target pixel is calculated for three pixels of (99,24), (99,25) and (99,26). Then, a difference between a vertical position of a pixel with a highest similarity degree and a vertical position of the target pixel is caused to be the amount of difference. For example, if the similarity degree of the pixel (99,24) is the highest among the above three pixels, the amount of vertical-direction difference is 24−25=−1.

Then, the minimum cost line calculator 113 records the determined amount of difference to the index buffer 114 (S6). At this time, an amount of difference is stored in each element of the index buffer 114, with a position of a target pixel for which a disparity was calculated immediately before the target pixel for which the disparity has been calculated at S5 as a base pixel. Therefore, the target pixel for which the disparity has been calculated at S5 is caused to be the base pixel, and the amount of difference stored is updated.

Figure 7:
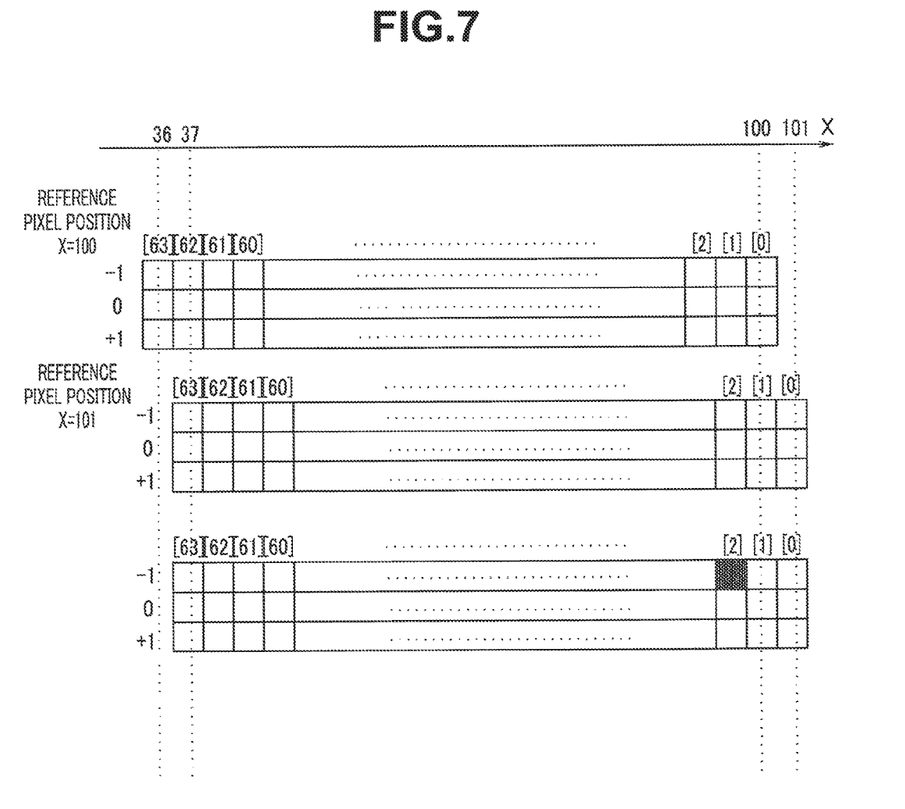
FIG. 7 is a diagram for illustrating an example of update of an amount of difference stored in each element of the index buffer 114 accompanying change of a base pixel.

FIG. 7 is a diagram for illustrating an example of update of the amount of difference stored in each element of the index buffer 114 accompanying change of the base pixel. Target pixels are sequentially set while the base image is being raster-scanned. If a horizontal position of the target pixel for which the disparity has been calculated at S5 is X=101, a horizontal position of the target pixel for which the disparity has been calculated immediately previously is X=100. Therefore, in each element of the index buffer 114, an amount of difference with the pixel at X=100 as a base pixel is stored. Therefore, as shown in a top part of FIG. 7, an amount of difference at X=36, an amount of difference at X=37, . . . , an amount of difference at X=100, which is the base pixel position, are stored in the element [63], the element [62], . . . , and the element [0], respectively, as indexes.

When the position of the base pixel becomes X=101, it is necessary to update the index of each element so that an amount of difference at X=37, . . . , an amount of difference at X=100 and an amount of difference at X=101, which is the base pixel position, are stored into the element [63], . . . , the element [1] and the element [0], respectively. That is, as shown in a middle part of FIG. 7, as the position of the base pixel is updated, the index stored in each element is stored again, being updated with the index of an immediately previous element.

In this way, the base pixel is updated to the target pixel for which the disparity has been calculated at S5 and the amounts of difference determined at S5 are recorded to the index buffer 114. Since the disparity of the target pixel is 2, the element [2] which stores the amount of difference at the base pixel position−2 pixels is updated, and the amount of difference determined at S5 is stored as an index (a bottom part of FIG. 7).

If there is a pixel in the base image for which disparity search has not been performed (S7: NO), a next pixel in the order of raster scanning is set as a target pixel (S8). A series of processes from S2 to S6 is performed for all pixels in the base image to perform disparity search and collection of vertical-direction difference information. As the number of pixels for which disparity calculation has been performed increases, difference information recorded in the index buffer 114 is accumulated.

Figure 8:
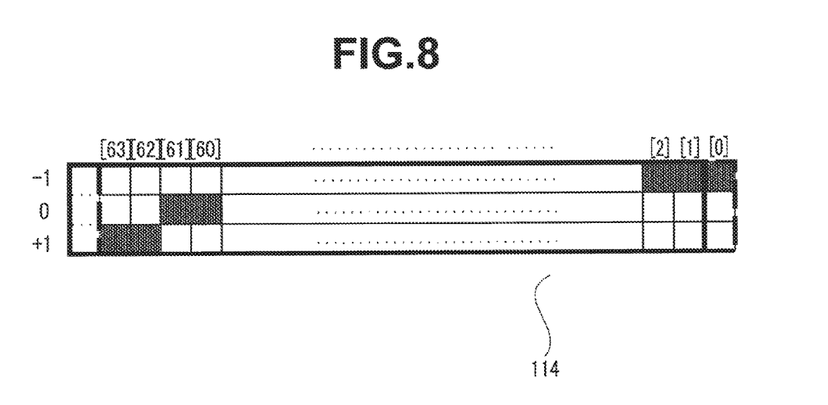
FIG. 8 is a diagram illustrating an example of the index buffer 114 in a state that difference information has been accumulated.

FIG. 8 is a diagram illustrating an example of the index buffer 114 in a state that difference information has been accumulated. Most of a horizontal-direction search range at a next target pixel (a range in a broken-line thick frame) overlaps with a horizontal-direction search range at an immediately previous target pixel (a range in a thick frame). That is, a range from the element [63] to the element [1] overlaps with the search range at the immediately previous target pixel. Therefore, as for the common part, one vertical-direction search target pixel can be identified for such a position that an amount of difference is recorded therefor by accumulation made so far, among respective horizontal-direction positions in the search range.

Note that the disparity is different for each target pixel in many cases. For example, if a disparity of a pixel A (100,25) and a disparity of a pixel B (101,25) are calculated as 2 and 3, respectively, in a base image, both of a horizontal position of a pixel with a highest degree of similarity to the pixel A and a horizontal position of a pixel with a highest degree of similarity to the pixel B are X=98 in a referenced image. In this case, an amount of difference about the pixel A is recorded in an element corresponding to the position of X=98 in the index buffer 114. Later, an amount of difference about the pixel B is also recorded in the element corresponding to the position of X=98. Therefore, the amount of difference about the disparity position of the pixel A is updated (overwritten) with the amount of difference about the disparity position of the pixel B, and used to identify vertical-direction positions of search pixels at a target pixel for which a disparity is to be calculated after that.

Further, if a disparity of a pixel C (102,25) is calculated as 2, a horizontal position of a pixel with a highest degree of similarity to the pixel C is X=100. Therefore, at X=99, an amount of difference cannot be obtained, and an index of a corresponding element remains empty. If the index is empty as described above, the coordinate converter 115 calculates a vertical position of the search pixel on an assumption that the amount of difference is 0.

On the other hand, if search of disparities of all pixels has ended in the base image (S7: YES), the sequential process for disparity calculation in the image processing apparatus 1 ends. Note that, when the disparities have been calculated for all the pixels constituting the base image, the distance image 7 is completed for the image.

The similarity degree search has been performed with the L rectified image 6*l* and the R rectified image 6*r* as a base image and a referenced image, respectively, in the above description. Note that it is also possible to, after calculating disparities for all the pixels of the L rectified image 6*l*, perform similarity degree search while exchanging the base image and the referenced image with each other, that is, to perform similarity degree search with the R rectified image 6*r* and the L rectified image 6*l* as a base image and a referenced image, respectively, and then calculate disparities using both search results.

As described above, the image processing apparatus 1 of the present embodiment sets a search pixel for each horizontal-direction position in a search area in a referenced image and calculates a similarity degree by the cost calculating unit 112, at a time of determining a disparity of each pixel in a base image. Then, after identifying a pixel with a highest similarity degree and calculating a disparity, the image processing apparatus 1 extracts, only for a position of the pixel, pixels located within a range of a maximum amount of difference in a vertical direction, and searches for a pixel with a highest similarity degree by the minimum cost line calculator 113.

Thereby, it is possible to, when a vertical-direction difference occurs between two images by dynamic difference between cameras due to vibration and the like, suppress increase in the number of functional units required for similarity degree calculation to the number corresponding to a maximum amount of vertical-direction difference and suppress increase in length of a processing time period. For example, when a maximum disparity is 256 pixels, and the maximum amount of difference is three lines, it is necessary, in a conventional method, to calculate similarity degrees for all pixels located in a search range and, therefore, calculate similarity degrees for 256×3=768 pixels. In the image processing apparatus 1 of the present embodiment, it is necessary to calculate similarity degrees only for 256+3=259 pixels. Therefore, it is possible to suppress increase in the number of functional units, and it is possible to suppress increase in the processing time period.

Further, the image processing apparatus 1 of the present embodiment records an amount of difference from a pixel with a highest degree of similarity to a target pixel, which has been calculated by the minimum cost line calculator 113, into the index buffer 114. Then, the coordinate converter 115 identifies a vertical position based on stored amount of difference, at each horizontal-direction position in a search area, and determines positions of search pixels. Thereby, it is possible to reduce occurrence of a mismatch of using a pixel for which a similarity degree is calculated high even though the pixel does not actually correspond to a target pixel for the disparity, and, therefore, matching accuracy is improved.

Note that, as for a search pixel for which a disparity from a target pixel is 0, an amount of difference cannot be referred to because a corresponding element does not exist in the index buffer 114, and, therefore, all pixels located on all lines within a range corresponding to a maximum amount of difference are caused to be search pixels, but only such pixels that the amount of difference is 0 may be caused to be search pixels.

Second Embodiment

If an element corresponding to a position for which an amount of difference is not calculated is empty in the index buffer 114, the image processing apparatus 1 of the first embodiment calculates a vertical position of the search pixel on an assumption that the amount of difference is 0. In comparison, the image processing apparatus 1 of a second embodiment estimates, even for a position for which an amount of difference has not been calculated, the amount of difference by interpolation based on the index stored in each element of the index buffer 114.

Figure 9:
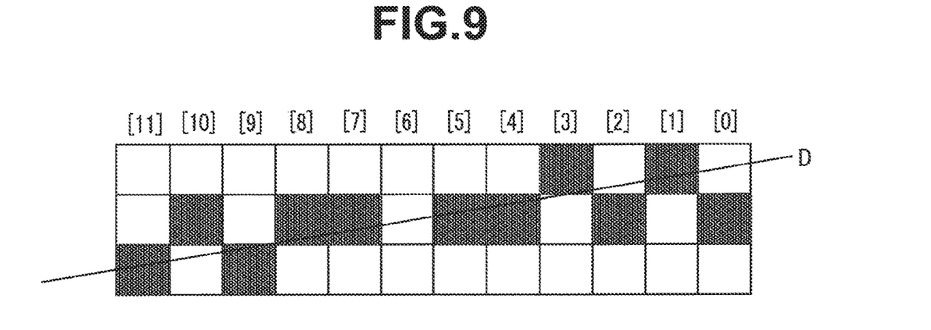
FIG. 9 is a diagram illustrating an example of the index buffer 114 in which an empty element exists in a state that difference information has been accumulated.
Figure 10:
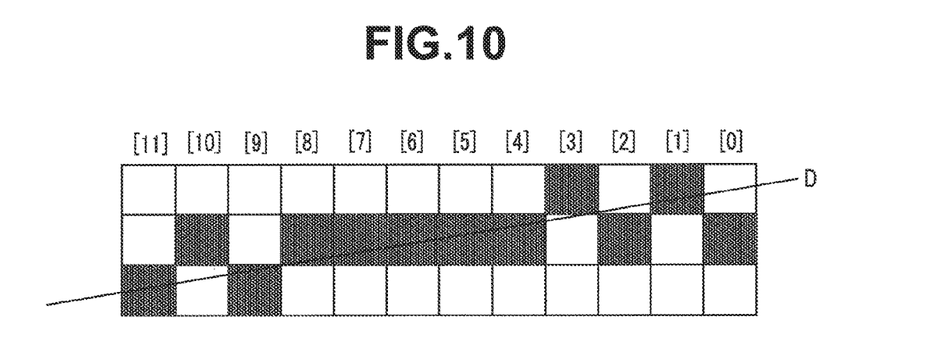
FIG. 10 is a diagram illustrating a state that an amount of difference of an element [6] of FIG. 9 is interpolated with use of an amount of difference of another element.

FIG. 9 is a diagram illustrating an example of the index buffer 114 in which an empty element exists in a state that difference information has been accumulated. Further, FIG. 10 is a diagram illustrating a state that an amount of difference of an element [6] of FIG. 9 is interpolated with use of an amount of difference of another element. In the index buffer 114 of FIG. 9, the amount of difference is not stored in the element [6], and the element [6] is in an empty state. The coordinate converter 115 generates an approximate straight line D using amounts of difference stored in other elements and interpolates an amount of difference of an empty element using the approximate straight line D. In a case of FIG. 9, the amount of difference is estimated to be 0 by an approximate straight line D generated with use of amounts of difference stored in elements [11] to [7] and elements [5] to [0] (see FIG. 10).

Using an estimated amount of difference and stored amounts of difference, the coordinate converter 115 determines position information about search pixels based on a target pixel position similarly to the first embodiment.

As described above, even for a position for which an amount of difference has not been calculated, interpolation is performed with use of amounts of difference of other positions. Thereby, similarity degree search can be performed in a state that a difference is closer to actual difference between a base pixel and a referenced pixel. Mismatches are reduced, and matching accuracy is much more improved.

Note that the approximate straight line D generated from the accumulated amounts of difference may be used to estimate a position (a vertical-direction position) of such a search pixel that a disparity from a target pixel for which a next search is to be performed is 0. In the first embodiment, all pixels within a range corresponding to a maximum amount of difference are caused to be search pixels. By estimating a vertical position, however, it is possible to limit the number of search pixels to one, and therefore, it is possible to shorten a processing time period.

Figure 11:
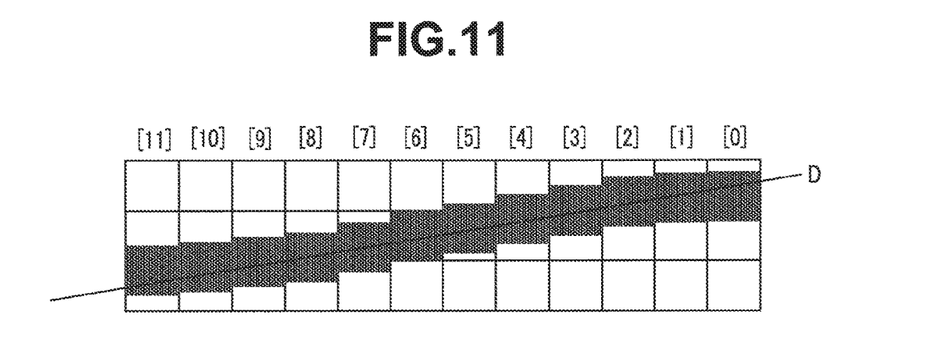
FIG. 11 is a diagram illustrating a state that a unit of an amount of difference of each element shown in FIG. 10 has been converted to sub-pixels.

Further, the coordinate converter 115 may convert a unit of an amount of difference from pixels (integer pixels) to sub-pixels (decimal pixels) using the approximate straight line D generated from the accumulated amounts of difference. FIG. 11 is a diagram illustrating a state that a unit of the amount of difference of each element shown in FIG. 10 has been converted to sub-pixels. For example, though the amount of difference of the element [11] before the conversion is 1, the amount of difference is converted to 0.2 by using the approximate straight line D. For example, if, in a case of a target pixel (101,25), a search pixel at a horizontal position (X=89) corresponding to the element [11] has been calculated as (89,26), the search pixel becomes (89,25.2) by converting the pixel unit to sub-pixel using the approximate straight line D.

When a search pixel position is inputted in the unit of sub-pixels, the line buffer MUX 111 generates pixel data of the position from pixel data of pixels located above and below the position in the vertical direction using an existing interpolation method such as bilinear interpolation. For example, in a case of the pixel position (89,25.2), pixel data of the pixel position (89,25.2) is generated with pixel data of pixel positions (89,25) and (89,26).

As described above, it is possible to, by determining an amount of difference in the unit of sub-pixels, perform similarity degree search in a state that a difference is closer to an actual difference between a base pixel and a referenced pixel, and, therefore, mismatches are reduced, and matching accuracy is much more improved.

Note that interpolation of an amount of difference and conversion to sub-pixel may be performed independently or may be performed by being freely combined. For example, estimation of an amount of difference at a position for which the amount of difference has not been calculated and estimation of a position (a vertical-direction position) of such a search pixel that a disparity from a target pixel is 0 may be performed with use of a same approximate straight line. The unit of an amount of difference after interpolation may be further converted to the unit of sub-pixels.

Further, it is also possible to divide a search area into two or more areas and generate an approximate straight line for each area to use the approximate straight area for interpolation and conversion to sub-pixel.

Each "section" in the present specification is a conceptual one corresponding to each function of the embodiments and does not necessarily correspond to particular hardware or a particular software routine one to one. Therefore, in the present specification, the embodiments have been described on an assumption of a virtual circuit block (section) having each function of the embodiments.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
a processor configured to:
calculate a degree of similarity between a first pixel in a first image and each of a plurality of second pixels located in a horizontal-direction first range in a second image, extract a second pixel with a highest similarity degree, and calculate a disparity from the first pixel;
calculate, only for the extracted second pixel, a degree of similarity between a plurality of third pixels existing in a vertical-direction second range that includes the extracted second pixel and the first pixel, in the second image, and extract a third pixel with a highest similarity degree;
record in an amount-of-difference buffer a difference between a vertical-direction position of the extracted third pixel and the first pixel as an amount of difference of the extracted third pixel;
determine positions of the second pixels for which a degree of similarity to the first pixel for which a disparity is calculated next is calculated, according to data of the amount-of-difference buffer, and
extract pixel data from the second image and input the pixel data for calculating the degree of similarity between the first pixel in the first image and each of the plurality of second pixels located in the horizontal-direction first range in the second image according to the determined positions of the second pixels, wherein
for each of the second pixels, the processor is configured to set, based on an amount of difference recorded in the amount-of-difference buffer, a position away from the position of the first pixel by the amount of difference as a vertical-direction position of the second pixel.

2. The image processing apparatus according to claim 1, wherein the first range is a range from a position of the first pixel up to a position away from the position of the first pixel by a maximum disparity in a horizontal direction.

3. The image processing apparatus according to claim 2, wherein, if there is a position for which an amount of difference is not recorded in the amount-of-difference buffer, the processor is further configured to estimate the amount of difference at the position based on recorded amounts of difference.

4. The image processing apparatus according to claim 3, wherein the processor is further configured to estimate the amount of difference at the position for which the amount of difference is not recorded, by determining an approximate straight line of amounts of difference relative to horizontal-direction positions based on the amounts of difference recorded in the amount-of-difference buffer.

5. The image processing apparatus according to claim 4, wherein the processor is further configured to extrapolate the approximate straight line to estimate an amount of vertical-direction difference of the second pixel at a horizontal direction position of the first pixel for which a disparity is calculated next.

6. The image processing apparatus according to claim 4, wherein the processor is further configured to set the vertical-direction position of the second pixel at each horizontal-direction position in units of sub-pixels using the approximate straight line.

7. The image processing apparatus according to claim 6, wherein the processor is further configured to interpolate the pixel data extracted from the second image and inputs the pixel data to calculate the degree of similarity between the first pixel in the first image and each of the plurality of second pixels located in the horizontal-direction first range in the second image according to the determined positions of the second pixels.

8. An image processing system comprising:
a memory configured to store a first image and a second image;
a second processor configured to rectify a static difference between the first image and the second image; and
the image processing apparatus according to claim 1 configured to rectify a dynamic difference between the first image and the second image rectified by the second processor and generate a distance image.

9. The image processing system according to claim 8, wherein, for each of the second pixels, the processor of the image processing apparatus sets, based on an amount of difference recorded in the amount-of-difference buffer, a position away from a vertical-direction position of the first pixel by the amount of difference as a vertical-direction position of the second pixel.

10. The image processing system according to claim 9, wherein, if there is a position for which an amount of difference is not recorded in the amount-of-difference buffer, the processor of the image processing apparatus estimates the amount of difference at the position based on recorded amounts of difference.

11. The image processing system according to claim 10, wherein the processor of the image processing apparatus estimates the amount of difference at the position for which the amount of difference is not recorded, by determining an approximate straight line of amounts of difference relative to horizontal-direction positions based on the amounts of difference recorded in the amount-of-difference buffer.

12. The image processing system according to claim 11, wherein the processor of the image processing apparatus sets a vertical-direction position of the second pixel at each horizontal-direction position in units of sub-pixels using the approximate straight line.

13. The image processing system according to claim 8, wherein the first image and the second image are a pair of disparity images.

14. An image processing method comprising the steps of:
determining a position of a first pixel in a first image;
extracting a plurality of second pixels located in a horizontal-direction first range in a second image;
extracting image data from the second image;
calculating a degree of similarity between the first pixel and each of the plurality of second pixels, extracting a second pixel with a highest similarity degree, and calculating a disparity;
calculating, only for the extracted second pixel, a degree of similarity between a plurality of third pixels existing in a vertical-direction second range that includes the extracted second pixel and the first pixel, in the second image, and extracting a third pixel with a highest similarity degree; and
recording a difference between a vertical-direction position of the extracted third pixel and a vertical-direction position of the first pixel into an amount-of-difference buffer as an amount of difference of the extracted third pixel; wherein
for each of the plurality of second pixels, a position away from the position of the first pixel by the amount of difference is determined as a vertical-direction position of the second pixel based on an amount of difference recorded in the amount-of-difference buffer.

15. The image processing method according to claim 14, wherein, if there is a position for which an amount of difference of a second pixel is not recorded in the amount-of-difference buffer, the amount of difference at the position is estimated based on recorded amounts of difference.

16. The image processing method according to claim 15, wherein the amount of difference at the position for which the amount of difference is not recorded is estimated by determining an approximate straight line of amounts of difference relative to horizontal-direction positions based on the amounts of difference recorded in the amount-of-difference buffer.

17. The image processing method according to claim 16, wherein the vertical-direction position of the second pixel at each horizontal-direction position is set in units of sub-pixels with use of the approximate straight line.

\* \* \* \* \*